(12) United States Patent
Rits

(10) Patent No.: US 8,453,199 B2
(45) Date of Patent: May 28, 2013

(54) WORKFLOW AUTHORIZATIONS EVALUATION IN MULTI-LAYERED APPLICATIONS

(75) Inventor: Maarten E. Rits, Nice (FR)

(73) Assignee: SAP AG, Walldorf (DE)

( * ) Notice: Subject to any disclaimer, the term of this patent is extended or adjusted under 35 U.S.C. 154(b) by 1042 days.

(21) Appl. No.: 12/051,580

(22) Filed: Mar. 19, 2008

(65) Prior Publication Data

US 2008/0282318 A1   Nov. 13, 2008

(30) Foreign Application Priority Data

Mar. 20, 2007  (EP) .................................... 07290339

(51) Int. Cl.
   *H04L 29/06*       (2006.01)
(52) U.S. Cl.
   USPC ....................................... 726/1; 726/4; 726/26
(58) Field of Classification Search
   None
   See application file for complete search history.

(56) References Cited

U.S. PATENT DOCUMENTS 6,047,283 A * 4/2000 Braun ................................... 1/1
   2008/0077853 A1 * 3/2008 Kriegesmann ............... 715/234

OTHER PUBLICATIONS

"International Application Serial No. 07290339.6-1245, Extended European Search Report mailed Aug. 24, 2007", 11 pgs.

"International Application Serial No. 07290339.6-1245, Response filed Oct. 10, 2007 to Extended European Search Report mailed Aug. 24, 2007", 6 pgs.
Jajodia, Sushil, et al., "Flexible Support for Multiple Access Control Policies", *ACM Transactions on Database Systems*, vol. 26, No. 2, (Jun. 2001), 214-260.
Wimmer, Martin, et al., "Consolidating the Access Control of Composit Applications and Workflows", *Data and Applications Security XX Lecture Notes in Computer Science*, LNCS, Springer-Verlag, vol. 4127, (2006), 44-59.
Wimmer, Martin, et al., "Optimized Workflow Authorization in Service Oriented Architectures", *Emerging Trends in Information and Communication Security Lecture Notes in Computer Science*; LNCS Springer-Verlag vol. 3995., (2006), 30-44.
Zhang, Yi, et al., "Modeling and Analyzing of Workflow Authorization Management", *Journal of Network and Systems Management*. vol. 12 , No. 4, (Dec. 1, 2004), 507-535.

* cited by examiner

*Primary Examiner* — Eleni Shiferaw
*Assistant Examiner* — Jeffery Williams
(74) *Attorney, Agent, or Firm* — Schwegman Lundberg & Woessner, P.A.

(57) ABSTRACT

There is provided a computer-implemented method, computer-program product, system and security index structure for a security enforcement strategy for a composite application. The method comprises providing a workflow for the composite application, wherein the composite application is constructed from a set of sub-applications and wherein at least a plurality of the sub-applications has a policy. A consolidated workflow policy is generated for the workflow by combining the policies of the sub-applications and by taking into account a control flow of the workflow, wherein the control flow provides an order in which the set of sub-applications are performed. The consolidated workflow policy is enforced by providing a security index structure for the consolidated workflow policy adapted for checking authorization in the workflow.

24 Claims, 15 Drawing Sheets (1) If $n.parent = \bot$ then $n.label \leftarrow$ '1'

(2) Else:

(2.1) If $n.parent.type =$ SEQUENCE then $n.label \leftarrow$ $\begin{cases} n.parent.label, & \text{if } n.prev = \bot \\ n.prev.label :: \text{'1'}, & \text{if } n.prev.type = \text{ACTIVITY} \\ n.prev.label :: \text{'[]1'}, & \text{if } n.prev.type = \text{SWITCH} \end{cases}$ (2.2) If $n.parent.type =$ SWITCH and
$n = n.parent.child(i)$ then
$n.label \leftarrow n.parent.label :: \text{'[i]'}$

*FIG. 2A*

```
input  : List L of ACTIVITY node labels on path p
         in execution order
output: Label of execution path p
                                                        ─── 320
1  p.label ← L.removeLast();
2  while ∃ pre, suf : p.label = pre :: '[' :: suf do
      /* Let p.label = pre :: '[' :: suf,                     */
      with ∄ s1, s2 : suf = s1 :: '[' :: s2  /* l = pre :: r1 */
3     l ← L.removeLast();
4     r1 ← l.trim(pre);
5     if r1.startsWith('[') then
6        nop;
         /* l doesn't provide information about
            the next SWITCH block                             */
7     else
8        m ← r1.count('[') − r1.count(']');
         /* m is the number of unclosed
            brackets in r1                                    */
9        p.label ← pre :: r1 :: ']^m :: suf;
10    endif                                              ─── 323
11 endw
```

321 (pointing to lines 3-6)
322 (pointing to line 8)

*FIG. 3A*

```
input : Label l to be inserted, node n of the trie
1  if l.startsWith(n.label) then
2     l.trim(n.label);
3     if ∃ descendant d of n : d.label = s :: r₁ and
       l = s :: r₂ then
4        insertNode(l, d);
5     else
6        n.addChild(l);
7     endif
8  else
   /* let s be the common prefix of n.label
      and l, i.e., n.label = s :: r₁
      and l = s :: r₂                          */
9     n.addChild(r₁);
10    n.addChild(r₂);
11    n.label ← s;
12 endif
```

FIG. 4A

```
input : Set L of path labels
output: Authorization trie t
1  t ← empty trie;
2  forall the label l ∈ L do
3     insertNode(l, t.root);
4  endfall
```

FIG. 4B input : Qualified label $l_p$ (prefix of an execution path label), ACTIVITY node label $l$
output: true if $l$ is a prefix of $l_p$, false otherwise 1 if $l_p.startsWith(l)$ then
2    | return true ;     /* $l$ is prefix of $l_p$ */
3 endif
4 if $l_p = s_1 :: '[^{m}{'}]' :: s_2$, with $m \neq \epsilon$ then
   /* with $\#p_2 \neq \epsilon$ ; $s_1 = p_1 :: '[^{p_2}{'}] :: p_3$ and $\#m_3 \neq \epsilon$ ; $m = m_1 :: '[^{m_2}{'}]' :: m_3$ */
5    | $l_p.remove(m)$;
6    | return isPrefix($l_p, l$);
7 endif
8 return false;     /* $l$ is no prefix of $p$ */

*FIG. 5A* input : Pointer $n$ to the currently analyzed node of the authorization trie, label $l$
output: true if authorization succeeds, false otherwise 1  if $n = \bot$ then
2      return false;                              /* empty trie */
3  endif
4  if $n.label = $ "" then
5      return true;                               /* fully authorized */
6  endif
7  if isPrefix($n.qualifiedlabel, l$) then
8      return true;         /* partially authorized */
9  else
10     if $\exists$ descendant $d$ of $n$ : isPrefix($d.qualifiedlabel, l$)
       then
11         $n \leftarrow d$;
12         return true;     /* partially authorized */
13     endif
14 endif
15 return false;                                  /* not authorized */

*FIG. 5B*

WORKFLOW AUTHORIZATIONS EVALUATION IN MULTI-LAYERED APPLICATIONS

CLAIM OF PRIORITY

The present patent application claims the priority benefit of the filing date of European Application (EPO) No. 07290339.6 filed Mar. 20, 2007, the entire content of which is incorporated herein by reference.

TECHNICAL FIELD

The description is directed generally to authorization, in particular, to authorization in multi-layered applications, and more particularly, to a computer-implemented method and a computer program product for a secure policy enforcement strategy for workflows representing composite applications comprising one or more sub-applications.

BACKGROUND

Service-oriented architecture (SOA) is a rapidly growing design option expressing a perspective of software architecture that defines the uses of loosely coupled software components such as services, applications, and processes. Using such a service-oriented computing paradigm, applications are increasingly implemented by means of composition of services and/or processes in order to ease both the reusability of modules, single processes, and/or services/service applications and the reconfiguration of workflows representing such composite services and applications.

With regard to security, services, processes, and applications of a composite application are autonomously performing user authentication and authorization. Although autonomously performed security checks are a prerequisite for the dynamic integration of services, processes, and/or applications and the realization of inter-organizational value creation chains, they lead to observable performance drawbacks, in particular regarding to rarely modified, but frequently executed services, processes, and/or applications, i.e. static ones.

In other words, due to authorization autonomy, requests to a composite application are repeatedly and, thus, potentially redundantly evaluated. Therefore, a separation of access control from a composite application brings about significant performance drawbacks.

Technical Terms

Following technical terms are widely used in the following. The terms may refer to but are not limited to the subsequently given explanations.

Workflow:

In general, a workflow may be considered as an operational aspect of a work procedure: how tasks are structured, who performs them, what their relative order is, how they are synchronized, how information flows to support the tasks and how tasks are being tracked. Accordingly, a composite application comprising a set of sub-applications such as Web services, loosely coupled in a service-oriented architecture may be modeled in a workflow wherein an invocation of any of the sub-applications may be represented by a sub-activity. A sub-application may be a self-contained software component (e.g. a Web service). The workflow may represent interdependencies between the sub-activities which must be considered when execution one or more of the represented sub-applications. In particular, workflow may be specified using (Web) service composition languages such as BPEL, BPM1, WSFL, or SWSL.

Control Flow:

In general, control flow may refer to an order in which individual statements or instructions of a computer program (in particular an imperative computer program) are implemented. With regard to workflows, the control flow of a workflow comprising a plurality of sub-activities may specify an order in which the sub-activities are performed and/or executed. For example, the workflow specification language BPEL is based on imperative program instructions.

Policy:

A policy comprises one or more access control rules. An access control rule may substantially comprise a condition, which must be fulfilled by a subject or an identity such as a requester in view of a requested application and/or service. A condition may substantially be a Boolean function, which may evaluate to true or false. A policy may be specified using a policy specification language such as XACML.

Consolidated Workflow Policy:

In general, a consolidated workflow policy may be inferred from a set of individual (security) policies through a bottom-up analysis of the workflow. More particular, the consolidated workflow policy may be based on the individual policies of the sub-activities comprised in the workflow and may have the following properties: (1) The consolidated policy should be as restrictive as possible to block requests which do not comply with the integrated sub-activities' policies (wherein unsuccessful executions of the workflow are prevented at an early stage), and (2) the consolidated policy should grant all necessary privileges to make the intended functionality available to legitimate users.

(Workflow) Tree:

In general, a tree may be a data structure that emulates a tree structure with a set of linked nodes. Each node in a tree may have zero or more child nodes, which are below in the tree (by convention, trees grown down, not up as they do in nature). A node that has a child is called the child's parent note. Nodes having at least one child are called inner nodes or structured nodes. Nodes that do not have a child node are called leafs. With regard to a workflow, a workflow specified in BPEL may be represented by a (workflow tree) wherein its inner, i.e. structured nodes may be represented by structured activities which may represent an execution command (e.g. whether subsequent activities may be executed in sequence or in parallel) in the workflow. Accordingly, the sub-activities of the workflow may be represented by leafs in a corresponding workflow tree. A node in a tree may be associated with a label (such as a string or a number), e.g. specifying the position of the node in the tree.

(Execution) Path:

An (execution) path, for example through a workflow, may be a connected sequence of sub-activities (which are connected by structured activities) in the workflow such that the workflow is in an exemplary aspect entered at its staring point and finished at its ending point.

Path Label:

An execution path in a workflow may be enhanced with a label, referred to as path label, which represents the positions of the sub-activities lying on the execution path in a corresponding workflow tree. In particular, each sub-activity may be labeled with information necessary to describe the position of the sub-activity in a workflow tree.

Authorization Trie:

In general, a trie (or prefix tree) is an ordered tree data structure that may be used to store an associative array where the labels are strings. The position of a node in a trie shows what label it is associated with. All the descendants of any one of the nodes have a common prefix of the string associated with that note. In an authorization trie, the path labels of executions paths of a workflow may be ordered, wherein a user is authorized to execute the contained execution paths. In other words, a path through the authorization trie may specify a path label of an execution path. Since a path label represents the positions of the sub-activities lying on the corresponding execution path, a prefix check may be performed in order to determine whether a sub-activity lies on that execution path or not. In particular, it may be checked whether the label of the sub-activity is a part, i.e. a prefix, of the path label.

SUMMARY

In one general aspect, a computer-implemented method for a security enforcement strategy for a composite application may comprise:
   providing a workflow for the composite application, wherein the composite application is constructed from a set of sub-applications and wherein at least a plurality of the sub-applications have a policy;
   generating a consolidated workflow policy for the workflow by combining the policies of the sub-applications and by taking into account a control flow of the workflow, wherein the control flow provides an order in which the set of sub-applications are performed; and
   enforcing the consolidated workflow policy by providing a security index structure for the consolidated workflow policy adapted for checking authorization in the workflow.

By providing a consolidated workflow policy, access control (i.e. policy enforcement) may be shifted from separately enforcing single policies for each of the sub-applications comprised in a composite application to the workflow layer. That is, a single consolidated policy may be enforced instead of a plurality of single policies which may be otherwise evaluated repeatedly and thus redundantly. In particular, a consolidated workflow policy may enable fast security evaluation of a composite application. Furthermore, by enforcing the consolidated workflow policy by providing a security index structure, the security index structure may allow checking both partial and full authorization of a workflow in an efficient manner. The security index structure may be based on a node labeling technique labeling both the sub-applications modeled in the workflow and the possible execution paths in the workflow allowing (consolidated) policy enforcement to be reduced to fast index checks.

Full authorization denotes that users are either authorized to execute all sub-activities (i.e. the sub-applications which are represented in the workflow) of the workflow or none at all. Partial authorization denoted that a user is authorized to execute at least one execution path of the workflow, but not necessarily all possible execution paths of the workflow. Using the security index structure, partial authorizations may be quickly and efficiently performed. In particular, execution times for redundantly executed individual security policies may be saved as well as superfluous execution attempts of sub-activities a user is not authorized to execute may be avoided.

By enforcing the consolidated workflow policy using a security index structure, the sub-applications of the workflow may be labeled. Hence, the labels may be used to check authority, i.e. enforce the consolidated workflow policy.

In particular, the sub-applications in the workflow may be labeled using a labeling technique that also allows for encoding both sequences and condition-based (i.e. switch-based) execution steps in the workflow. Furthermore, for each possible execution path in the workflow, a path label for each of the execution paths may be derived from the labels of the sub-applications.

According to another aspect, the method may further comprise:
   determining possible execution paths in the workflow.

According to yet another aspect, providing a workflow may further comprise:
   organizing the workflow in a workflow tree according to the control flow of the workflow, the workflow tree comprising at least one structured activity and a set of sub-activities, wherein the sub-activities represent invocations of the sub-applications, respectively.

According to yet another aspect, the method may further comprise:
   providing a node label activity for the at least one structured and a node label for each sub-activity of the set of sub-activities, respectively, wherein each of the node labels may comprise a label attribute and a type attribute. The node labels may further comprise information about the sub-activities' positions in the workflow.

According to yet another aspect, the method may further comprise:
   constructing at least one path label using some of the node labels that are along at least one execution path of the possible execution paths in the workflow.

According to yet another aspect, the method may further comprise:
   storing information about the least one execution path in an authorization trie, wherein the authorization trie may further store the at least one path label of the at least one execution path in the authorization trie.

According to yet another aspect, the method may further comprise:
   performing access control by means of an extended prefix check by checking whether a node label of a sub-activity of the sub-activities is a prefix of the path label of the at least one execution path of the authorization trie, wherein the sub-activity lies on the at least one execution path.

By using node labels for the sub-activities (i.e. invocations of the sub-applications) and path labels for possible execution paths in a workflow, wherein the path labels may be derived from the node labels and further by organizing the path labels in an efficient (security) index structure (which represents the authorities for the sub-activities in the workflow), in one exemplary aspect in a prefix tree, referred to as authorization trie, policy enforcement of consolidated policies may be reduced to simple node label tests. In particular, it may be tested whether a node label is a prefix of a path label or not, since a path label essentially merely contains more information (i.e. a combination of all node labels of sub-activities lying on the corresponding execution path) than a node label of a sub-activity lying on the corresponding execution path.

In another general aspect, there is provided a computer-program product comprising computer readable instructions, which when loaded and run in a computer system and/or computer network system, cause the computer system and/or the computer network system to perform a method as described. The computer-program product may further comprise program code means stored on a computer readable medium for performing any one of the above methods.

Furthermore, condition-based execution steps in a workflow may be encoded in node labels of the corresponding workflow tree. Therefore, authorizations of users may be organized in an efficient index structure such as an authorization trie.

In yet another general aspect, a workflow management system for security enforcement of a composite application may comprise:
- a workflow manager comprising a workflow for the composite application, wherein the composite application is constructed from a set of sub-applications and wherein at least a plurality of the sub-applications have a policy;
- a consolidated workflow policy for the workflow, wherein the consolidated workflow policy combines the policies of the sub-applications by taking into account a control flow of the workflow, wherein the control flow provides an order in which the set of sub-applications are performed; and
- a security index structure for the consolidated workflow policy adapted for checking authorization in the workflow.

According to yet another aspect, the system is further operable to perform operations according to any one of the described methods.

In yet another general aspect, a security index structure for policy enforcement in a workflow management system may comprise:
- at least one execution path of a set of possible execution paths of a workflow comprising a set of sub-activities; and
- at least one path label for the at least one execution path, wherein the path label identifies those sub-activities of the set of sub-activities that lie on the at least one execute path.

By using a security index structure to perform user authorization in a workflow having a consolidated workflow policy, both partial and full authorization of the workflow may be checked more efficiently. In particular, using a labeling technique according to the described method, workflow authorizations may be organized in a fast security index structure. Based on an authorization index (i.e. one or more path labels for execution paths a user or a group of users is authorized to execute), access control of (static) (composite) applications and services is performed by means of an extended prefix check.

Details of one or more implementations are set forth in the accompanying exemplary drawings and exemplary description below. Other features will be apparent from the description and drawings, and from the claims.

BRIEF DESCRIPTION OF THE DRAWINGS

FIG. 2A shows an exemplary formal definition of the node labeling rules.

FIG. 3A shows an exemplary pseudo-code implementation of a path labeling algorithm.

FIG. 4A shows an example pseudo-code implementation of a node insertion algorithm to insert a node according to a path label into the authorization trie.

FIG. 4B shows an example pseudo-code implementation of an authorization trie construction algorithm.

FIG. 5A shows an exemplary pseudo-code implementation of the extended prefix check.

FIG. 5B shows an exemplary pseudo code implementation of checking an authorization of a user based on the extended prefix check algorithm.

DETAILED DESCRIPTION

In the following, a detailed description of examples will be given with reference to the drawings. It should be understood that various modifications to the examples may be made. In particular, elements of one example may be combined and used in other examples to form new examples.

In general, composite applications consist of a set of sub-applications such as services and/or processes. Composite applications may be realized according to the paradigm of service-oriented computing, e.g. using a service oriented architecture (SOA), loosely coupling the sub-applications. Composite applications may be modeled in a workflow according to their control flow.

Usually, each of the sub-applications in a composite application is having a separate (security) policy and thus, autonomously enforces access control according to its own policy. Therefore, a workflow of a composite application reveals a multi-layered security model (i.e. multi-layered policies), denoting that access control (i.e. policy enforcement) is thus iteratively performed. On the one hand side, such a software design guarantees the security requirements of each of the sub-applications, but on the other hand side, execution time and resources are wasted because of redundant access control checks as well as of superfluous execution attempts of sub-applications. This may happen in particular if a user is granted the permission to execute some sub-applications but lack authorization at some later stage in the control flow of the composite application. Due to this fact, actions invoked so far have to be rolled back or—even worse—need to be compensated.

These performance limitations and drawbacks may be avoided if access control is enforced by a workflow management system (WFMS) managing the composite applications. For this purpose, the policies of the sub-applications coupled in a composite application may be combined in a consolidated workflow policy. In general, a consolidated workflow policy may be obtained through combining the individual (security) policies of the sub-applications by taking into account the control flow of the composite application. The WFMS may then supervise the state of executions and blocks requests in case workflow branches are entered that are not permitted for the corresponding request context.

Figure 1:
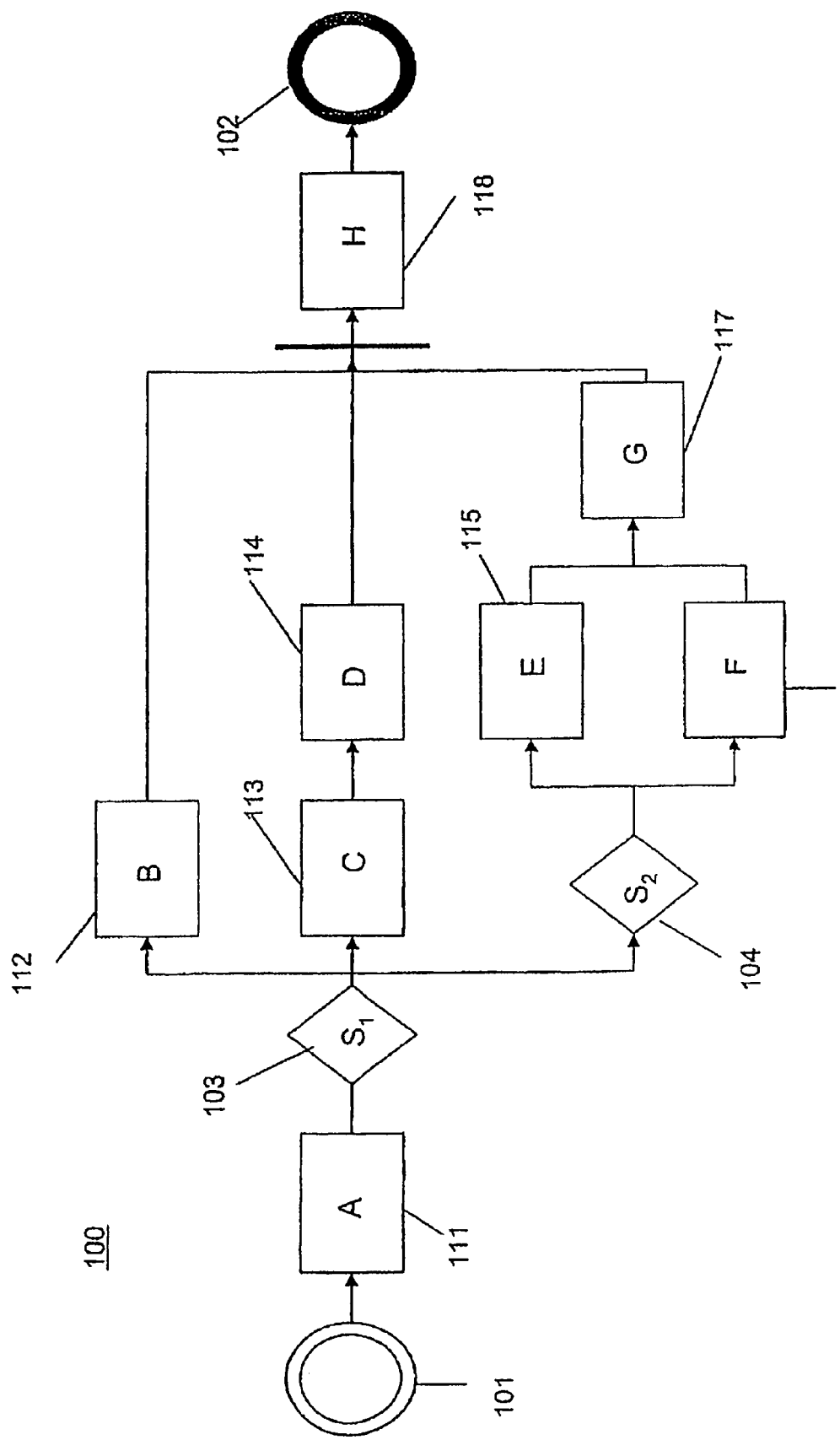
FIG. 1 shows a block diagram of a first exemplary workflow representing the control flow of a first exemplary composite application.

FIG. 1 shows an exemplary workflow 100 of an exemplary composite application, comprising one or more sub-applications A to H (111 to 118). The sub-applications A to H (111 to 118) are referred to as sub-activities A to H (111 to 118) in the workflow 100 representing and modeling, respectively the composite application. The workflow 100 is stared by a starting element 101 and finished by an ending element 102. The sub-activities A to H (111 to 118) in the workflow 100 are arranged according to the control flow of the composite application by means of a fixed set of control flow patterns following the control flow patterns of iterative programming languages such as BPEL (Business Process Execution Language for Web Services. In one exemplary aspect, the control flow patterns of BPEL (i.e. "switch" (condition-based), "pick" (event-based), "sequence" (sequential), "flow" (parallel execution), and "while" (loops)) may be represented by two abstract patterns referred to as a Switch block 103, 104 and as a Sequence block 105, 106, 107. In particular, a BPEL while pattern, i.e. a loop may be mapped to a Sequence block 105, 106, 107.

A Sequence block 105, 106, 107 of the workflow 100 as shown in FIG. 1 represents the execution of all sub-activities following the Sequence block 105, 106, 107, e.g. from the Sequence block at sub-activity C 113 the execution of sub-activities D 114, and H 118 is possible. A Switch block 103 and 104 of the workflow 100 represents the execution of one sub-activity following the Switch block 103, 104, e.g. from the Switch block $S_2$ 104 the execution of either sub-activity E 115 or of sub-activity F 116 is possible.

Figure 1A:
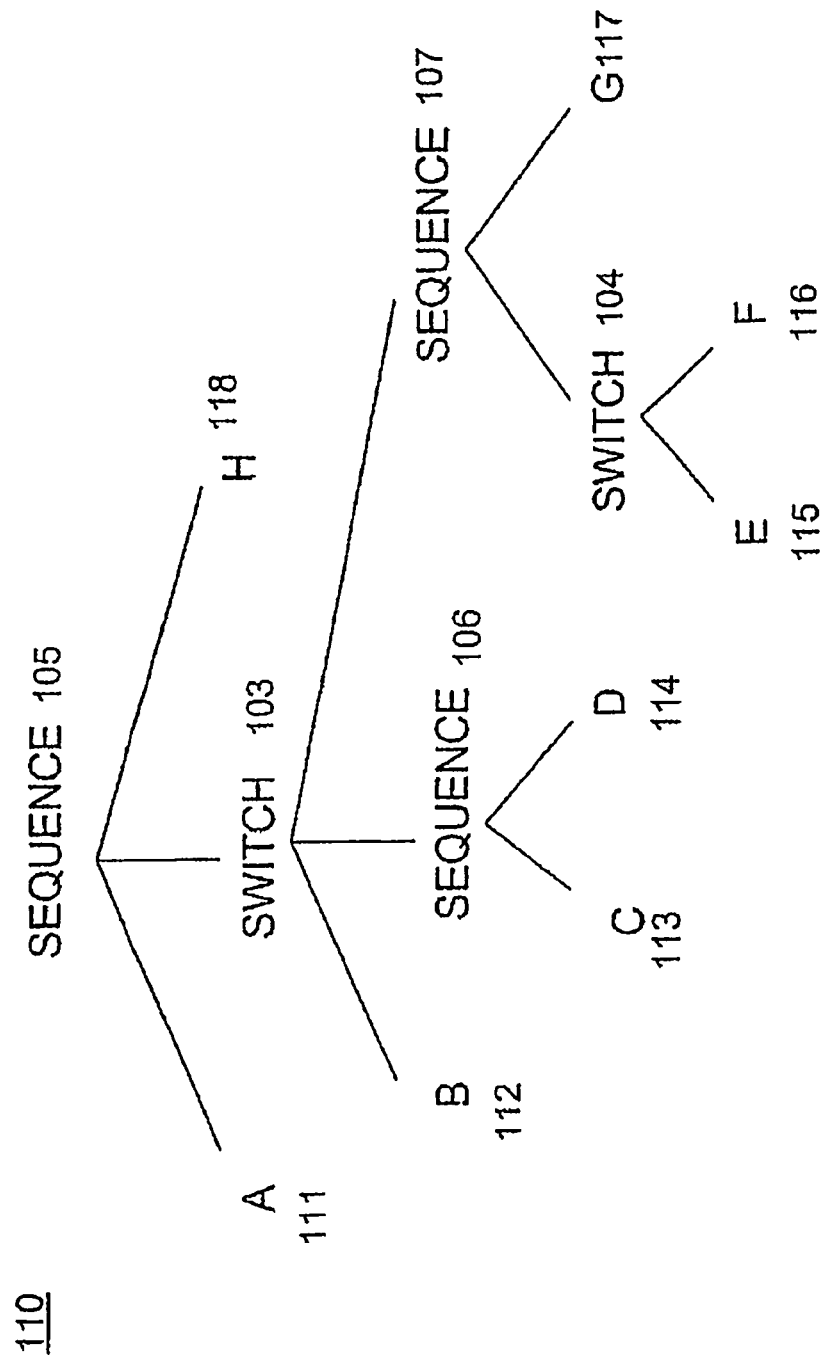
FIG. 1A shows a first example workflow tree of the first exemplary workflow.

A user (who makes a request to access the workflow 100) is authorized to execute a Sequence block 105, 106, and 107, if he/she is allowed to execute all of the succeeding sub-activities. For example, if the user is authorized to execute the first Sequence block 105 in the workflow 100, then he/she is allowed to execute the sub-activity A 111, the first Switch block 103, and the sub-activity H 118 in the workflow 100, since sub-activities A and H (111 and 118) as well as the first Switch block 103 are children of the first Sequence block 105 in a workflow tree 110 used to model and represent, respectively the workflow 100. The workflow tree 110 of the workflow 100 is shown in FIG. 1A.

Analogously, a user (who makes a request to access the workflow 100) is partially authorized for a Switch block 104, if he/she is permitted to execute at least one of its succeeding sub-activities E 115 or F 116, i.e. at least one of the children of the Switch block node 104 of the corresponding workflow tree 110. A user is referred to as fully authorized for the Switch block 104 in the workflow 100, if he/she is permitted to execute all of the succeeding sub-activities E 115 and F 116, i.e. all of the children of the Switch block node 104 of the corresponding workflow tree 110.

As shown in FIG. 1, access control interdependencies of the composite application are modeled through a recursive nesting of the Sequence blocks 105, 106, 107 and the Switch blocks 103, 104 in the workflow 100. A Sequence block 105, 106, and 107 may be referred to as a sequential execution step in the workflow 100 and a Switch block 103 and 104 may be referred to as a condition-based execution step in the workflow 100. A representation of the authorization interdependencies of the workflow 100 corresponding to the control flow of the composite application may be given in terms of the workflow tree 110 shown in FIG. 1A. In other words, the workflow tree 110 can be regarded as a condensed representation of the workflow 110 specification of the composite application. In one exemplary aspect, the workflow specification of the workflow 100 may be given in BPEL.

A consolidated workflow policy for the workflow 100 of the composite application can be obtained by a bottom-up analysis of the corresponding workflow tree 110. For this purpose, it is differentiated between full authorization and partial authorization. In this regard, full authorization denotes that a user is either authorized to execute all sub-activities A to H (111 to 118) of the workflow 100 or none at all. Partial authorization denotes that a user is authorized to execute certain branches (i.e. paths) of the workflow 100, but not necessarily all of them. A path in the workflow 100 is a sequence of sub-activities 111 to 118, Sequence blocks 105, 106, 107, and/or Switch blocks 103, 104 such that the path is entered at the workflow's starting element 101 and finished at the ending element 102. Furthermore, from each of the sub-activities 111 to 118, Sequence blocks 105, 106, 107, and/or Switch blocks 103, 104 there exists an edge to the next sub-activity 111 to 118, Sequence block 105, 106, 107, and/or Switch block 103, 104 in the corresponding workflow tree 110. For example, sub-activities A, F, G, and H (111, 116, 117, 118) define a path A→F→G→H in the workflow 100.

Full authorizations are in principle determined through combining the access control policies of all sub-activities A to H (111 to 118) of the workflow 100.

Partial Authorizations are in principle determined through obtaining consolidated policies of sub-activities, which are along a path in the workflow tree 110, respectively the workflow 100 of the composite application such as A 111, F 116, G 117, and H 118. For example, if a user is authorized to execute the path A→F→G→H (111, 116, 117, 118), the user must be authorized by the policies $P_A$, $P_F$, $P_G$, and $P_H$ of the corresponding sub-applications represented by the sub-activities A, F, G, and H (111, 116, 117, 118) in the workflow 100.

If a partially authorized user is executing the workflow 100, his/her execution history needs to be supervised by the WFMS managing the workflow 100. In particular, authorization of the user needs to be reevaluated when any of the Switch blocks 103, 104 of the workflow 100 is entered. Contrary, a fully authorized user needs to be checked only at the beginning of an execution of the workflow 100.

Figure 7:
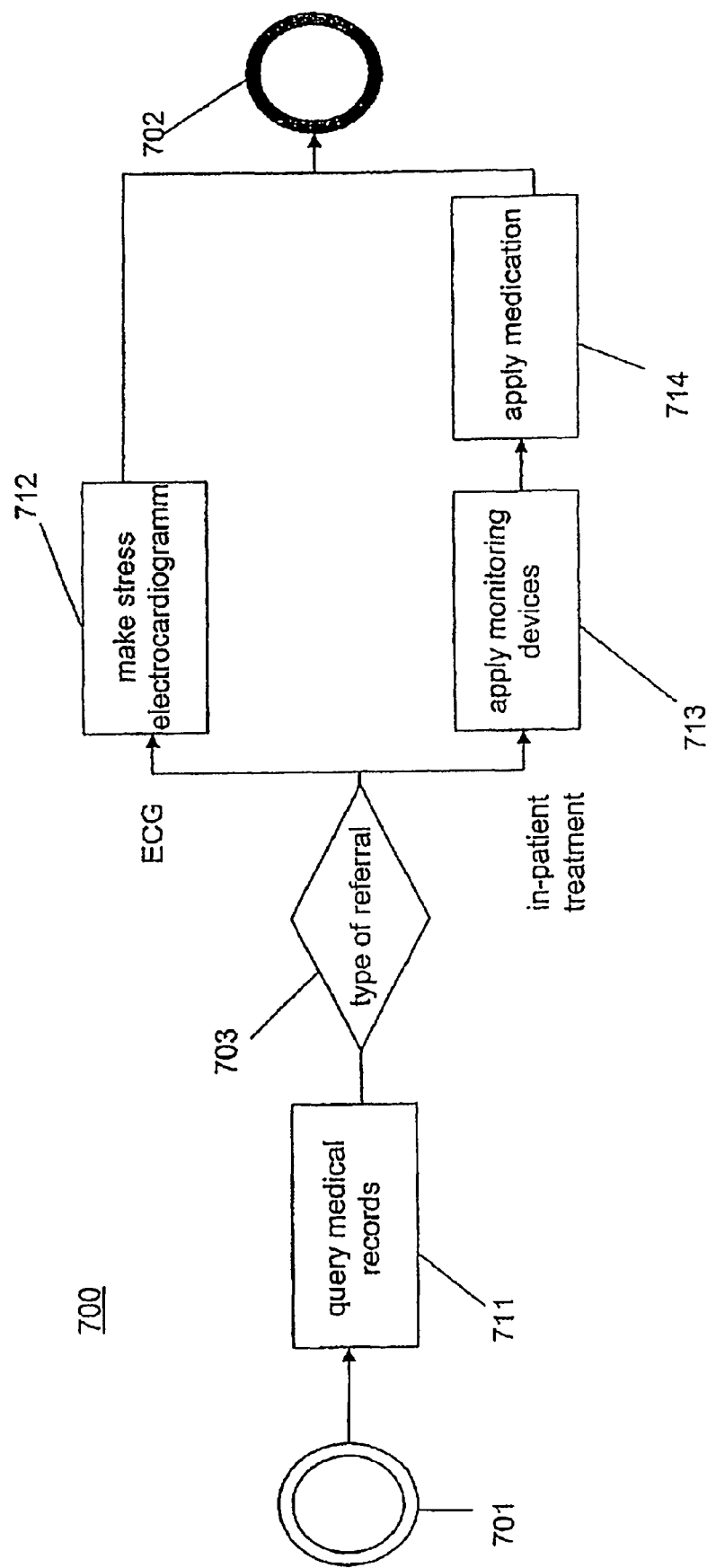
FIG. 7 shows a block diagram of an exemplary e-health workflow representing the control flow of an exemplary e-health composite application.
Figure 7A:
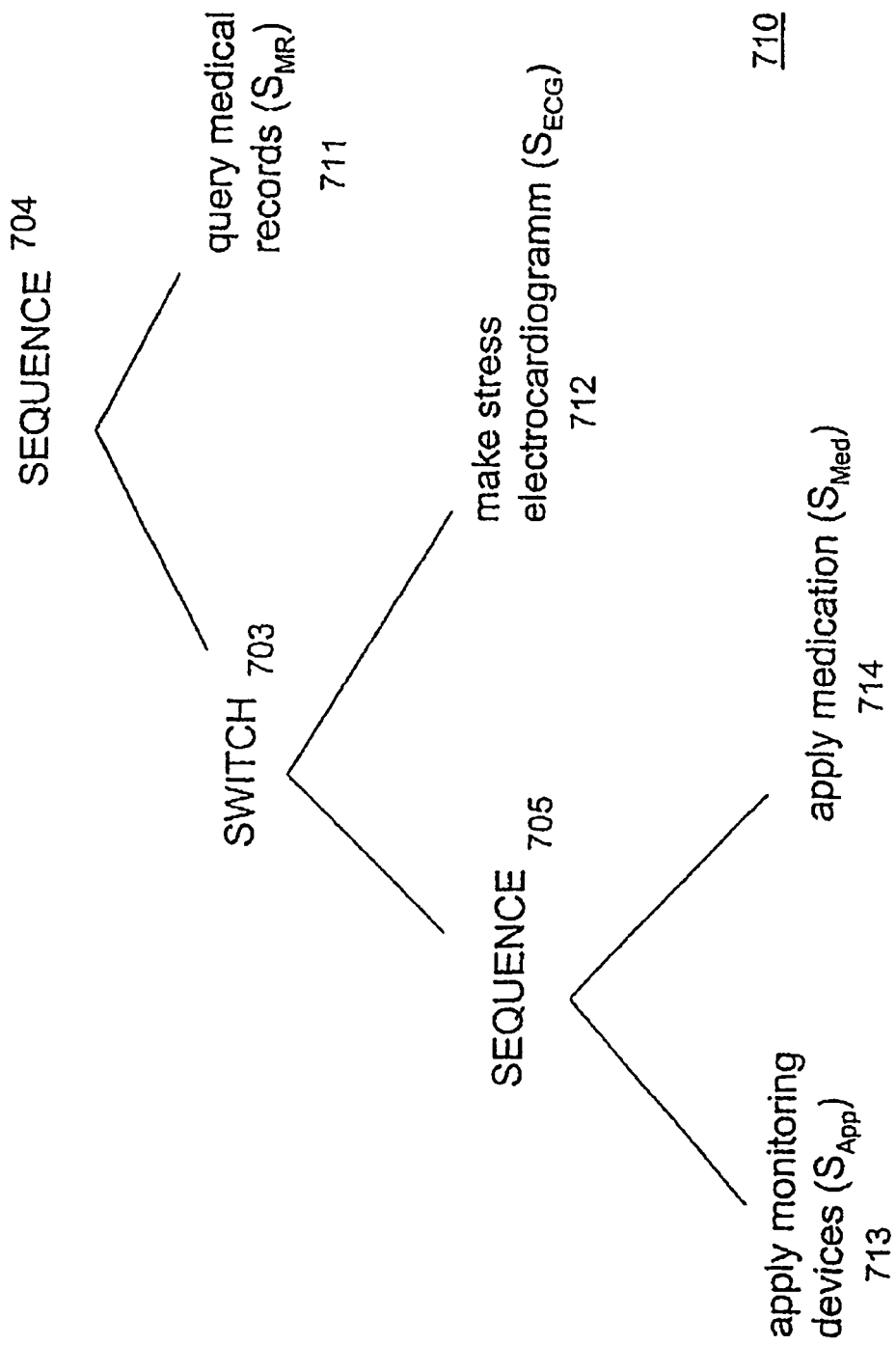
FIG. 7A shows a workflow tree of the exemplary e-health workflow.

A possible application example of a workflow for an exemplary composite e-health application and a corresponding consolidated workflow policy is shown in FIGS. 7 and 7A. The e-health workflow 700 of FIG. 7 may be executed when a patient is transferred to the cardiology department of a hospital. Depending on some diagnostic findings 703, either an in-patient treatment 713, 714 is applied or an electrocardiogramm (ECG) 712 is made. Each of the individual sub-activities 711, 712, 713, 714 of the workflow 700 is enforcing its individual (security) policies. In case the individual policies are not consolidated, reliable workflow execution might be hindered. For example, an administrative employee may be allowed to query medical records of patients 711, but are not allowed to perform any medical treatment 712, 713, and 714. Hence, the administrative employee is authorized by some sub-activity 711 but rejected by other sub-activities 712, 713, and 714 of the e-health workflow 700.

The sub-activities 711 to 714 of the workflow 700 illustrated in FIG. 7 may model information processing tasks such as an update of the stock of medications stored in a database. For example, the sub-activities 711 to 714, e.g. to be realized as Web services have the following access rules, i.e. policies:

Health personal with permanent employment and administrative personal are allowed to access the medical records of patients 711. This access control rule refers to the subject specification $S_{MR}$, which is allowed to execute the sub-activity "query medical records" 711.

Nurses of the cardiology and internists are allowed to update medical records, e.g. by inserting ECG results, i.e. the subject specification SECG comprising nurses of the cardiology and internists are allowed to execute the sub-activity "make stress electrogardiogram" 712.

Internists having the subject specification $S_{App}$ are allowed to perform the sub-activity "apply monitoring devices" 713.

The sub-activity "apply medication" 714 can be performed by nurses and internists, having the subject specification $S_{Med}$.

In one exemplary implementation of the workflow 700, i.e. the control flow of the sub-applications comprised may be specified in BPEL and the policies of the sub-applications 711 to 714 may be defined in XACML.

As previously introduced with respect to FIGS. 1 and 1A, a workflow 100 may be represented by a workflow tree 110. Accordingly, the exemplary e-health workflow 700 may be represented by a composition of Sequence blocks 704, 705 and a Switch block 703 in a corresponding workflow tree 710. In other words, the authorization dependencies of the workflow 700 may be represented in terms of the corresponding workflow tree 710. Using a bottom-up analysis, a consolidated workflow policy for the workflow 700 can be inferred. That means in particular that the policies defined for the individual sub-applications, which are represented by the sub-activities 711 to 714 of the workflow 700, are iteratively aggregated without demanding for relaxation tests bottom up according to the workflow tree 710:

Firstly, $S_{App}$ and $S_{Med}$ are intersected since both corresponding sub-activities 714 and 713 are linked in the second Sequence block 705 of the workflow tree 710, i.e. internists are authorized to execute the second Sequence block 105, since they are authorized to execute the sub-activity "apply monitoring devices" 713 as well as the sub-activity "apply medication" 714.

Subsequently, the Switch block 703 is evaluated. Subjects, which are granted full authorization for this Switch block 703 are denoted with S, which refer to internists, since internists are allowed to "make stress electrogardiogram" 712 as well as to perform the Sequence block 705 according to the previously performed intersection. Furthermore, nurses, denoted with S' are granted partial authorization since they are only authorized for the ECG-branch.

Finally, the second Sequence block 704 is evaluated. For this purpose, S and S' are both intersected with $S_{MR}$, i.e. health personal with permanent employment and administrative personal, which is allowed to "query medical records" 711.

Thus, the workflow 700 is executable for internists and for nurses, wherein internists are fully authorized and nurses are partially authorized. All other subjects, e.g. administrative personal can be blocked right from the beginning, as they will never succeed in reaching an ending element 702 of the workflow 700.

Using a naive policy enforcement strategy for a consolidated workflow policy for a workflow 100 to evaluate a partial authorization, a method may collect policies that apply to execution paths in a corresponding workflow tree 110 and evaluate them at each Switch block 103, 104 comprised in the workflow 100. In view of the workflow 100 shown in FIG. 1, policies for all of the four possibilities have to be evaluated at a first Switch block $S_1$ 103. In particular, using this naive enforcement strategy, the number of policies that are to be evaluated for each of the Switch blocks 103, 104 grows exponentially. For example, if n Switch blocks are grouped by a Sequence block and each of the Switch blocks has at most m choices, then $O(m^n)$ distinguished path policies apply to the first of the n Switch blocks.

A more efficient policy enforcement strategy for a consolidated workflow policy for a workflow 100 may be based on using an appropriate index structure, referred to as an authorization trie according to which the WFMS of the workflow 100 needs to check a user's authority only at a starting element 101 of the workflow 100 and at each Switch block 103, 104 comprised in the workflow.

In one exemplary aspect, an authorization trie may be relied on a (concise) node labeling technique for a workflow tree 110 of a workflow 100.

A workflow 100 may be technically implemented using BPEL. Using BPEL, the corresponding workflow specification is coded in XML syntax. That means in particular that the workflow specification represents an XML tree with the inner nodes being structured activities and the leaves being service invocations of sub-applications referred to as sub-activities. By means of the abstraction from BPEL patterns to Sequence and Switch blocks, the workflow 100 may be represented by a workflow tree 110 as shown in FIG. 1A. Formally, a workflow tree 110 (i.e. a particular XML tree) is recursively defined as follows (using the XML DTD syntax):

```
WorkflowTree ::= WFComponent
WFComponent ::= Activity | Sequence | Switch
Sequence ::= (Activity | Switch)+
Switch ::= WFComponent+
```

In particular, workflow trees according to the present description represent abstractions of BPEL processes, with a single difference from BPEL that due to the third rule of the formal syntax definition, Sequence blocks are not nested. Non-nested Sequence blocks have (in principle) no semantic limitations. According to the workflow tree 110 shown in FIG. 1A, Sequence blocks 105, 106, 107 and Switch blocks 103, 104 represent structured activities, i.e. structured nodes in the workflow tree 110, and A to H (111 to 118) represent sub-activities, i.e. leaves (non-structured nodes) in the workflow tree 110, which refer to invocations of the corresponding sub-applications of the composite application modeled by the corresponding workflow 100.

Using XPath, the node selection operations "parent" (selecting the current node's parent node), "prev" (selecting the preceding sibling node of node n), and "child(i)" (selecting the $i^{th}$ child of node n) are in principle used to traverse a workflow tree 110. Furthermore, nodes have attributes "label" (being the node's label) and "type" (being the node's type, i.e. Sequence, Switch, or Activity). Formally, a node n of a workflow tree 110 is labeled as shown by the definition given in FIG. 2A.

According to the node labeling rules given in FIG. 2A, the meta-characters '[' and ']' denote a beginning and an end of a Switch block 103, 104, i.e. a sub-tree of a workflow tree 110 of which the root is an instance of a Switch block node 103, 104. Furthermore, for workflow tree nodes not integrated in a Switch block 103, 104, the information inside the Switch block 103, 104 is faded out. In particular, the node labeling rules define a global order encoding for nodes of type Switch or Activity. In other words, the labels for Switch nodes 103, 104 and Activity nodes 111 to 118 are unique.

Figure 2:
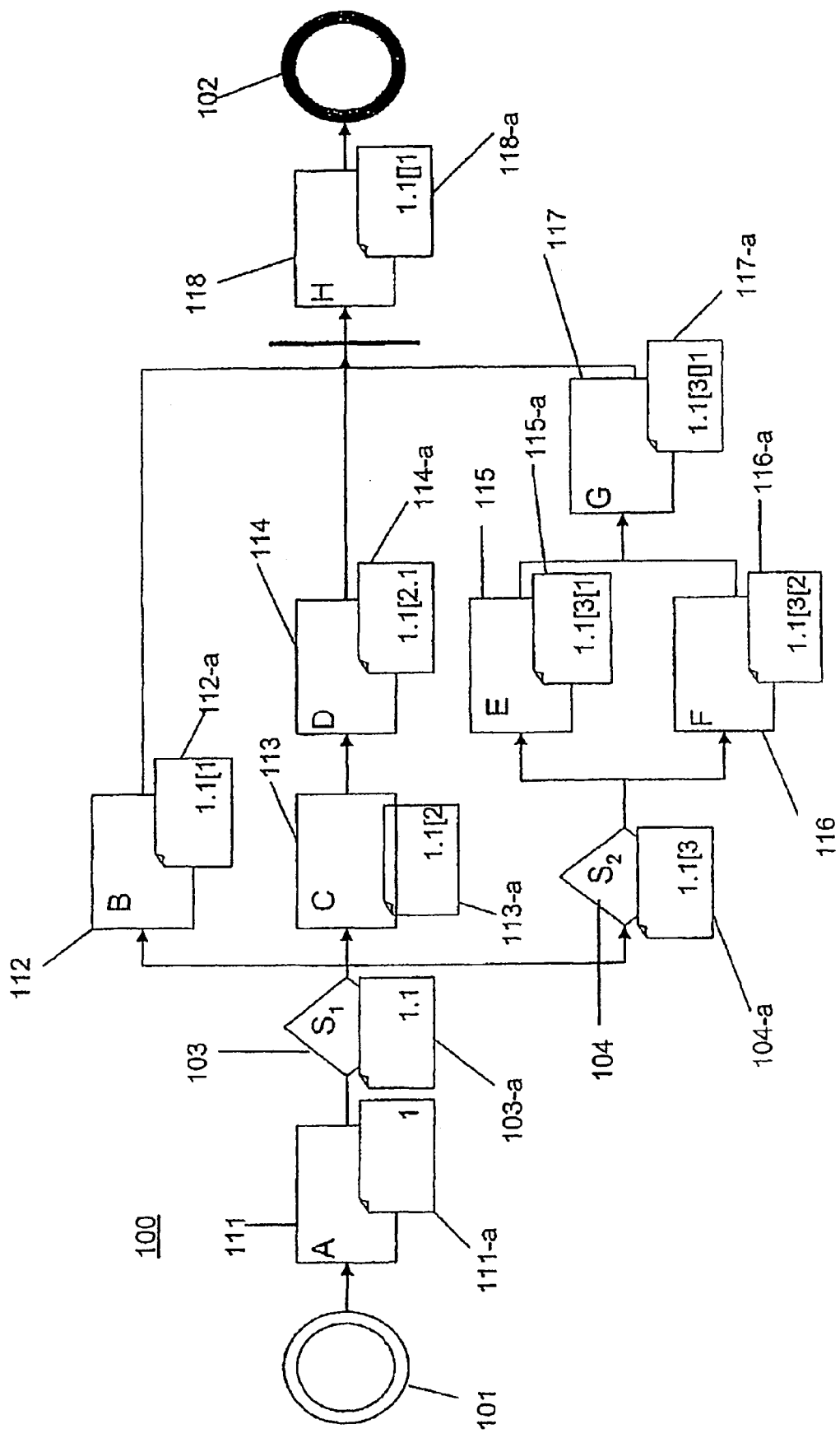
FIG. 2 shows a block diagram of the first exemplary workflow with node labels using node labeling rules.

FIG. 2 shows an exemplary application of the above specified labeling rules on a workflow tree 110 of a workflow 100. For example, a label 111-6 of sub-activity F 116 is '1.1[3[2'. The label 116-a of the sub-activity F 116 specifies that this sub-activity 116 is integrated into two nested Switch blocks 103 and 104, which is denoted by the two opening brackets '['. That is, the sub-activity F 116 may be reached in the workflow tree 110, by following the third sub-activity 104 of the outer Switch block 103 and selecting the second child in the inner Switch block 104 of the corresponding workflow tree 110. Labeling (using the node labeling rules) the subsequent node form the sub-activity F 116, i.e. sub-activity G 117, a label of the sub-activity G 117 is '1.1[3[ ]1' 117-a, since the sub-activity G 117 follows the inner Switch block 104 according to rule (2.1) of the labeling rules given in FIG. 2A. Accordingly, the contents of the preceding Switch block 104 is blinded out.

Figure 3:
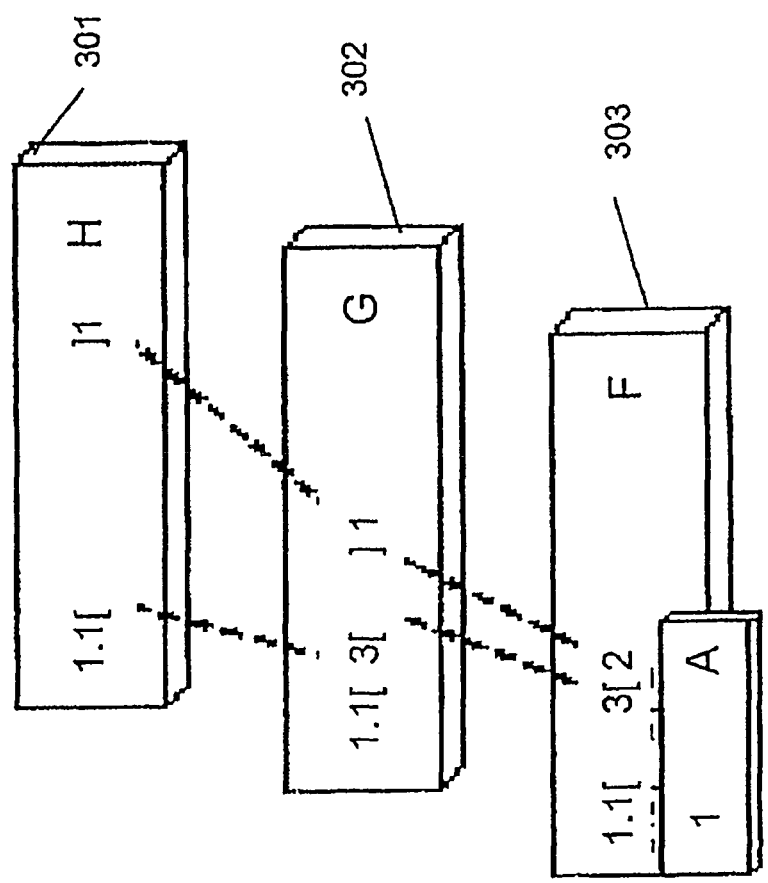
FIG. 3 shows a flow diagram of a construction of a path label for an execution path in the first exemplary workflow.

With reference to FIG. 3, an example to construct a path label according to the previously introduced node labeling technique is shown. The path label represents an execution path from sub-activities A, F, G, and H (111, 116, 117, and 118) in the workflow 100 illustrated in FIG. 1. An execution path of the workflow 100 is a possible path through the workflow 100 from the starting element 101 to the ending element 102. An example pseudo-code implementation of an algorithm to construct a path label such as the path label '1.1[3[2]1]1' for the execution path A→F→G→H(111, 116, 117, 118) from node labels 111-a, 116-a, 117-a, and 118-a of the sub-activities 111, 116, 117, 118 lying on the execution path in the workflow 100 is shown in FIG. 3A. Different from the node labels 111-a, 116-a, 117-a, and 118-a, the path label 300 of the execution path A→F→G→H (111, 116, 117, 118) identifies all sub-activities A, F, G, and H (111, 116, 117, and 118) that lie on this execution path A→F→G→H (111, 116, 117, 118) in the workflow 100. The exemplary pseudo-code algorithm is doing this by analyzing the corresponding node labels 111-a, 116-a, 117-a, and 118-a from the last sub-activity H 118 to the first sub-activity A 111 in the execution path, i.e. from the end to the beginning of the corresponding execution path A→F→G→H (111, 116, 117, 118).

In an initialization phase 320 of the exemplary path labeling algorithm shown in FIG. 3A, the last node label 118-a of the last sub-activity H 118 of the possible execution path A F→G→H (111, 116, 117, 118) is selected. In a while section 321, the remaining node labels 117-a, 116-a, and 111-a of the remaining sub-activities G, F, and A (117, 116, and 111) are iteratively analyzed in opposite direction to the possible execution path A→F→G→H (111, 116, 117, 118). In an if section 322, the special case is handled that an empty Switch block is in the path label to be constructed, i.e. that the empty Switch block does not provide information about the sub-activities within the next Switch block. Accordingly, the respective last node label in the queue is analyzed to decide whether it provides information about the next Switch block. Otherwise, the corresponding node label section $r_1$ providing information about the currently analyzed Switch is inserted into the path label.

For example, at sub-activity H 118, the last node label, i.e. '1.1[ ]1' 118-a is selected (step 301). The 1 is inserted into the path label, and at position [ ] of the node label 118-a of H 118, and the corresponding node section '3[ ]1' of the node label of the preceding sub-activity G 117 in the possible execution path A→F→G→H (111, 116, 117, 118) is inserted into the path label 300 (step 302), yielding a intermediate path label '1.1[3[ ]1]1'. Further, at the remaining position [ ] of the intermediate path label, the corresponding node section '3[2' of the node label of the preceding sub-activity F 117 is inserted (step 303), yielding the path label '1.1[3[2]1]1'. In particular, according to an execution command 323 of the if section 322 of the path labeling algorithm, a processed always constitutes the last node in the Switch block, e.g. at node label '1.1[ ]1' 118-a, the last node (i.e. sub-activity) G 117 in the respective Switch block 103 of the workflow 100 is constituted.

In other words, to construct the path label '1.1[3[2]1]1' of the possible execution path A→F→G→H (111, 116, 117, 118) in the workflow 100 using the exemplary algorithm of FIG. 3A, the corresponding node labels 111-a, 116-a, 117-a, and 118-a are considered bottom up: The algorithm selects in the initialization phase 120 the node (i.e. sub-activity) H 118 in the (possible) execution path (step 301). The next analyzed node (i.e. sub-activity) is G 117, which fills the empty Switch segment of the corresponding Switch block 103 in the node label '1.1[ ]1' 118-a of node H 118 with the string '3[ ]1' of its corresponding node label '1.1[3[ ]1' 117-a, obtaining an intermediate path label '1.1[3[ ]1]1', which still contains an empty Switch segment (step 302). This empty Switch segment can be filled by constituting the last node in the corresponding Switch block 104, which is sub-activity F 116. Hence, the empty Switch block can be filled with the string '3[2' of the corresponding node label '1.1[3[2' 116-a, and obtaining the path label '1.1[3[2]1]1' for the (possible) execution path A→F→G→H (111, 116, 117, 118) in the workflow 100 (step 303).

Figure 4:
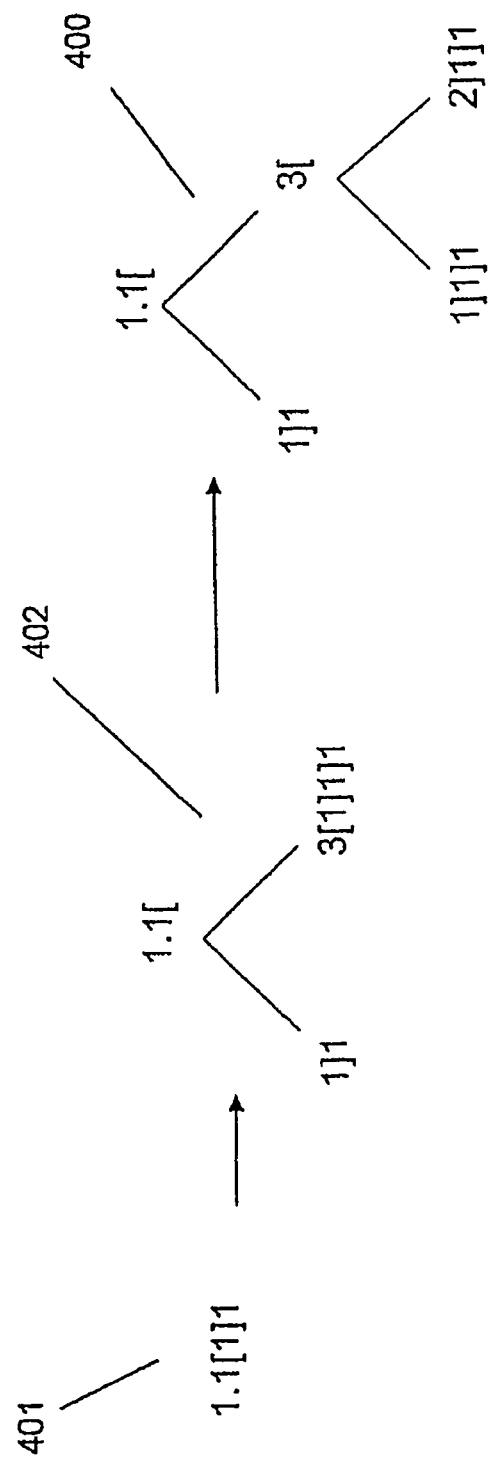
FIG. 4 shows a construction of an exemplary authorization trie according to the path label for the execution path in the first exemplary workflow.

The previously introduced node and path labeling techniques (for a workflow 100 by considering a corresponding workflow tree 110) is used to organize consolidated workflow policies in a fast and efficient index structure, which is referred to as an authorization trie. A construction of an example authorization trie 400 for at least one user or a group of users authorized to execute at least one path in the workflow 100 is shown in FIG. 4.

Before performing access control on the workflow 100, i.e. before enforcing a consolidated workflow policy of the policies of the sub-activities A to H (111 to 118), an authorization trie for the consolidated workflow policy is generated. Due to this purpose, possible execution paths in the workflow 100 are determined in a first step. In a second step, path labels corresponding to the possible execution paths in the workflow 100 are inferred. In one exemplary aspect, the path label algorithm shown in FIG. 3A is used. In a last step, consolidated path policies are generated by combining policies of sub-activities (111 to 118) that lie on the corresponding possible execution paths in the workflow. Accordingly, a user is authorized to execute a certain execution path, if he/she is authorized to execute the particular sub-application corresponding to the sub-activities (111 to 118) that lie on the execution path.

Table 1 illustrates possible execution paths in the workflow 100 shown in FIG. 1.

TABLE 1

| id | path | path label | combined policies |
|---|---|---|---|
| $p_1$ | A → B → H | 1.1[1]1 | $P_A, P_B, P_H$ |
| $p_2$ | A → C → D → H | 1.1[2.1]1 | $P_A, P_C, P_D, P_H$ |
| $p_3$ | A → E → G → H | 1.1[3[1]1]1 | $P_A, P_E, P_G, P_H$ |
| $p_4$ | A → F → G → H | 1.1[3[2]1]1 | $P_A, P_F, P_G, P_H$ |

In Table 1, $P_X$ represents the policy (i.e. access control rules) applying to sub-activity X.

A consolidated path policy specifies a group of users which is authorized (or permitted) to execute at least one execution path in the workflow 100. A user authorized to execute path $p_1$ in the workflow, i.e. a user who is authorized to execute the sub-applications which correspond to the sub-activities A, B, and H (111, 112, and 118) in the workflow 100 has a ticket for the execution path $p_1$. The user may additionally possess further tickets for execution paths $p_3$ and $p_4$ in the workflow 100. The tickets for the execution paths $p_1$, $p_3$ and $p_4$ are gathered and stored in an authorization trie. The authorization trie represents a type of credential, which a security system of the WFMS evaluates in order to check the authorization of the user, i.e. the authorization trie is used to enforce the consolidated policy for the workflow 100.

In order to efficiently determine authorizations and, thus, to provide good search performance, an authorization trie is a search tree, organizing comprised tickets of at least one user. A construction of an example authorization trie 400 for at least one user authorized to execute the execution paths $p_1$, $p_3$ and $p_4$ in the workflow 100 is shown in FIG. 4. An exemplary algorithm to construct an authorization trie 400 of a user from tickets (i.e. execution paths, the user is authorized to execute) is shown terms of a pseudo-code implementation in FIG. 4B. In one exemplary aspect, the exemplary authorization trie construction algorithm uses an algorithm to insert certain nodes that lie on an execution path according to the exemplary algorithm given in pseudo-code in FIG. 4A.

In case a user is granted full authorization for the workflow 100, i.e. the user is allowed to execute all sub-applications corresponding to the sub-activities A to H (111 to 118) in the workflow 100, a corresponding authorization trie consists of a single node having the label '*'.

In case a user is granted partial authorization for the workflow 100, i.e. the user is allowed to execute certain execution paths, e.g. paths $p_1$, $p_3$ and $p_4$ in the workflow 100, the corresponding authorization trie 400 is constructed as shown in FIG. 4, e.g. y applying the algorithms of FIGS. 4A and 4B. Since the user is authorized to execute the paths $p_1$, $p_3$ and $p_4$, he/she possesses the tickets having the path labels '1.1[1]1', '1.1[3[1]1]1', and '1.1[3[2]1]1'. The path labels are inserted in the presented order in the authorization trie 400. In a first insertion step 401, the path label '1.1[1]1' for the execution path $p_1$ is inserted into the authorization trie 400. Subsequently, the path label '1.1[3[1]1]1' for the execution path $p_3$ is additionally inserted such that the new node of an intermediate authorization trie 402 denotes a path to the first Switch block 103, the left child of the intermediate authorization trie 402 defines (together with its root) the execution path $p_1$ and the right child of the intermediate authorization trie 402 defines (together with its root) the execution path $p_3$. Finally, the path label '1.1[3[2]1]1' for the execution path $p_4$ is inserted such that the right child of the authorization trie 400 denotes a path to the second Switch block 104 in the workflow from which the sub-activities E and F (115 and 116) may be reached.

Using the authorization trie 400, the WFMS merely needs to evaluate the authorization of a request, when entering the workflow 100 and when entering a Switch block 103, 104 of the workflow 100. When starting the workflow 100 at the starting element 101, legitimate users have a non-empty authorization trie 400 and may be grant either full authorization or partial authorization. In case of full authorization, i.e. in case an authorization trie merely contains a single node having the label '*', no further security checks are necessary. In case of partial authorization, workflow executions of the workflow 100 are supervised by the WFMS. Furthermore, the workflow 100 is preferably reevaluated, when the workflow 100 enters a Switch block 103, 104. In any other case, i.e. when entering a Sequence block 105, 106, 107 or in parallel execution, an authority to execute a sub-activity 111 to 118 in the workflow 100 may be inferred from the determined possible execution paths, corresponding path labels and consolidated path policies, i.e. from the previously introduced preprocessing phase.

For example, a user being authorized for path $p_4$ in the workflow 100 is authorized to execute the sub-applications which correspond to the sub-activities A, F, G, and H (111, 116, 117, and 118). Hence, the user is partially authorized to execute the workflow 100. Therefore, the WFMS checks first when entering the workflow 100 at the starting element 101, whether the user is allowed to execute the workflow 100 at all and second before executing the sub-application corresponding to the sub-activity F 116, i.e. when entering the preceding Switch blocks 103 and 104. The user is then implicitly authorized to perform sub-activities G and H (117 and 118), because authorization for sub-activity F 116 has been successful. In other words, the authorization for sub-activity F 116 is only inserted into the authorization trie 400 of the user, if the user is authorized for a complete execution path through the workflow 100, i.e. a path from the starting element 101 to the ending element 102. Since sub-activities G and H (117 and 118) are in sequence to the Switch blocks 103 and 104 that contain sub-activity F 116, sub-activities G and H (117 and 118) are on the authorized path $p_4$. This authorization check of an authorization trie 400 of a user or a group of users comprising the user's authorized execution paths in the workflow 100 is for example performed by an algorithm as shown in FIGS. 5A and 5B.

The algorithm, which checks authority of a user and/or a group of users, operates on an authorization trie 400 and evaluates whether a match with a node label 111-$a$ to 118-$a$ of a next requested sub activity A to H (111 to 118) can be achieved.

The exemplary algorithm for checking authority of a user and/or a group of users according to their presented authorization trie 400 for the workflow 100 reduces search costs (and is thus more efficient) by memorizing the last node in the authorization trie 400 that lead to the authorization of the previously checked sub-activity 111 to 118 referred to as qualified label. The qualified label is preferably added as an attribute to a node in the authorization trie 400. The qualified label of a node in the authorization trie 400 preferably represents the node's label combined with labels of its ancestor nodes. For example, the qualified label of node '3[' in the authorization trie 400 is '1.1[3['.

Figure 5:
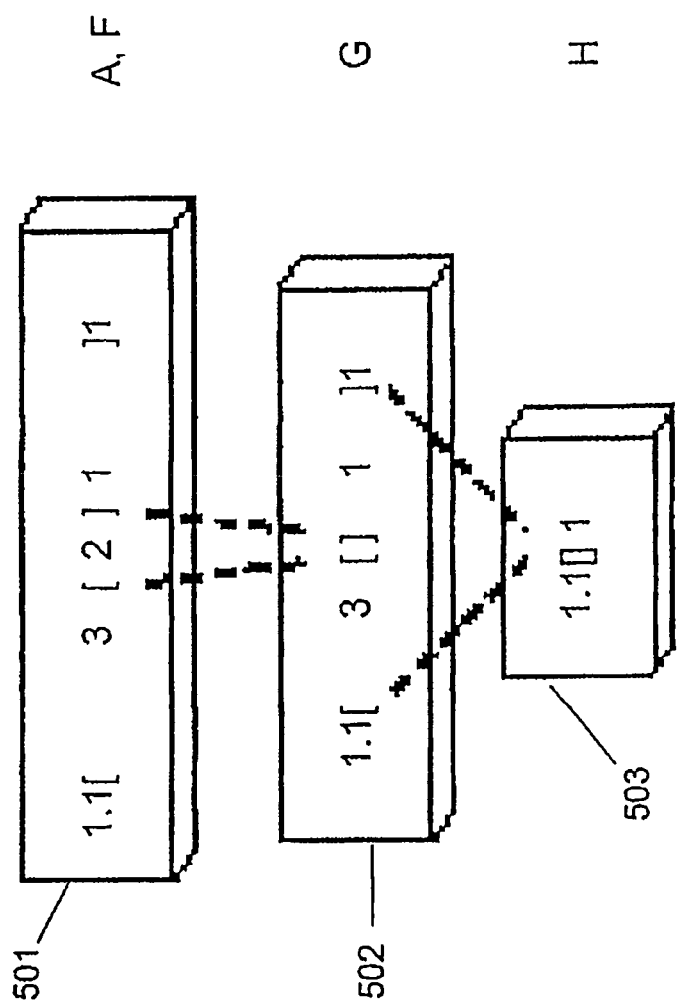
FIG. 5 shows in a block diagram an extended prefix check of the path label of the execution path according to a node label in the first exemplary workflow.

For example, the algorithm to check authorization comprises a first if section 511, a second if section 512, and a third if section 513. The first if section 51 handles requests of non-authorized users having an empty authorization trie. The second if section 512 handles requests of fully authorized users having an authorization trie with a single node having label '*'. Evaluation of partial authorization according to an authorization trie 400 is handled in the third if section 513. Partial authorization is checked by means of an extended prefix check according to the exemplary algorithm shown in FIG. 5A. An extended prefix check is done by checking whether a node label 111-$a$ to 118-$a$ of a sub-activity A to H (111 to 118) in the workflow 100 is a prefix of a qualified label of a node or any child of the node in the authorization trie 400. For this purpose, a path label of the authorization trie 400 is preprocessed according to the algorithm of FIG. 5A. Preprocessing is done in order to blind out inner structures of Switch blocks 103, 104 comprised in the path label, but blinded out in node labels 111-$a$, 116-$a$, 117-$a$, 118-$a$ lying on the execution path having the path label. In particular, the path label is iteratively compressed by removing leftmost non-empty Switch patterns from inside to outside (according to the workflow tree 110). A construction of a compressed path label from the path label is shown in FIG. 5 by applying the algorithm of FIGS. 5A and 5B.

For example, performing an extended prefix check according to the algorithm of FIG. 5A, on a path label '1.1[3[2]1]' for the execution path A→F→G→H (111, 116, 117, 118) in the workflow 100, the node label '1.1[ ]1' 118-*a* of the corresponding sub-activity H 118 matches with the path label. The path label is preprocessed: Starting with the path label '1.1[3[2]1]1' 300 in step 501, the leftmost and innermost brackets are emptied first. Accordingly, an intermediate result 502 is '1.1[3[ ]1]1', which still contains a non-empty bracket. Accordingly, the remaining non-empty bracket is cleared, and the preprocessed path label '1.1[ ]1' is obtained (step 503). Since the node label '1.1[ ]1' 118-*a* of the corresponding sub-activity H 118 matches with the preprocessed path label '1.1[ ]1' of the path label '1.1[3[2]1]1' for the execution path A F→G→H (111, 116, 117, 118) in the workflow 100, the node label 118-*a* is an extended prefix of the path label. Thus, the sub-activity H 118 is allowed to be executed by a request from a user having the authorization trie 400 shown in FIG. 4 for the workflow 100 comprising a ticket for the execution path A→F→G→H (111, 116, 117, 118).

Figures 6, 6A:
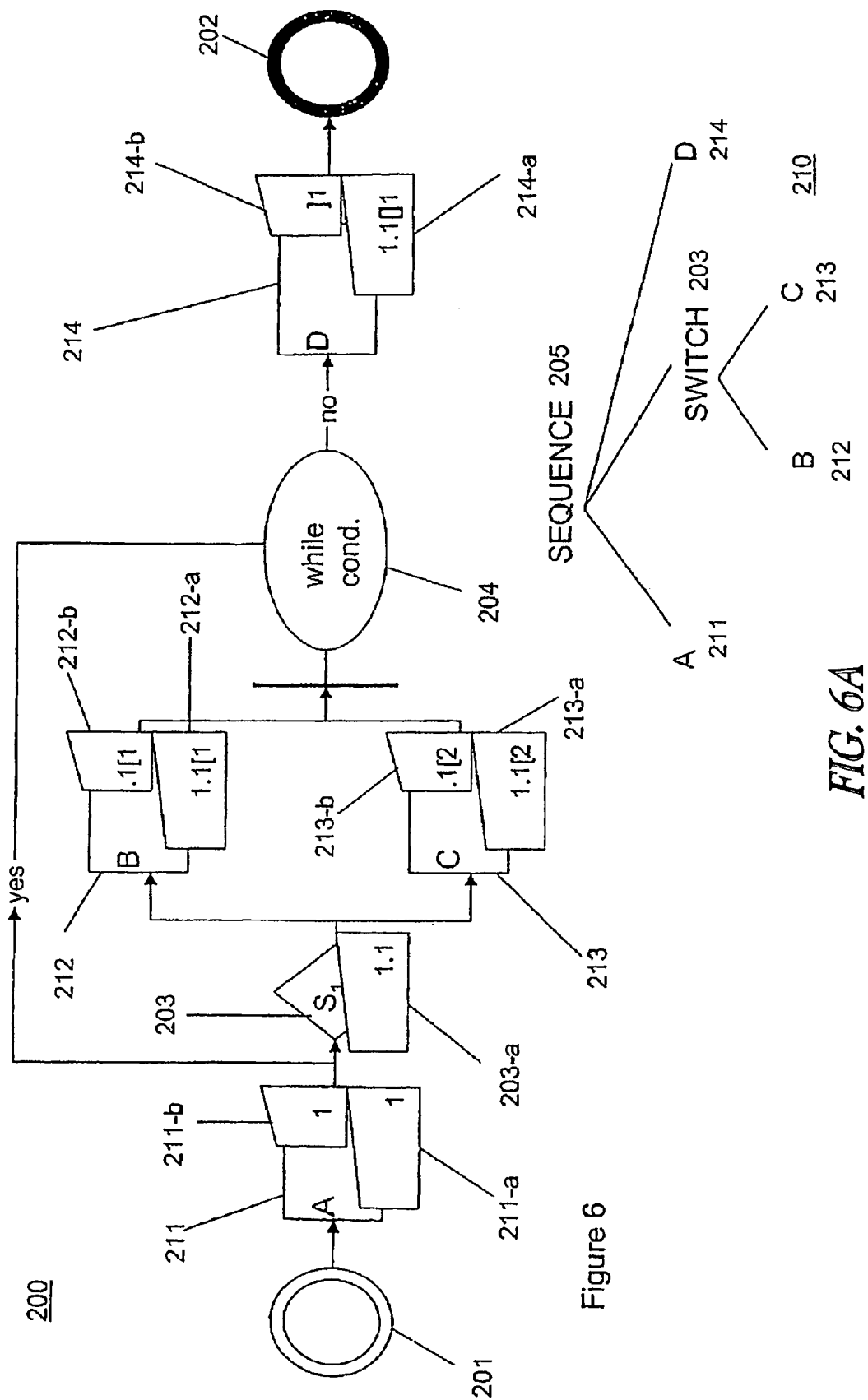
FIG. 6 shows a block diagram of a second exemplary workflow representing a second exemplary composite application with node labels using the labeling rules and with node labels based on an alternative node labeling technique.
FIG. 6A shows a second exemplary workflow tree of the second exemplary workflow.

An alternative labeling technique may also be used in an enforcement strategy for composite applications with a consolidated workflow policy. For example, so-called local order encoding may be used. An example workflow 200 and a corresponding workflow tree 210 are shown in FIGS. 6 and 6A. Local order encoding would use local order information to encode node labels 211*b* to 214-*b* of sub-activities A to D (211 to 214) of the workflow 200. In particular, local order encoding represents a modified version of the previously introduced node labeling technique, differing in that the labels of parents are not considered for the definition of node labels 211-*b* to 214-*b*. Using local order encoding to label the sub-activities A to D (211 to 214) in the workflow tree 210, path labels may be constructed by concatenating the labels 211-*b* to 214-*b* of the nodes (i.e. sub-activities 211 to 214) that lie on a certain path in the workflow 200. Due to this reason, access control may be reduced to prefix strings between a path label and a node label 211*b* to 214-*b*, i.e. an authorization trie comprising at least one ticket for at least one user needs not to be preprocessed.

However, using the alternative labeling technique to label the sub-activities A to D (211 to 214) in the workflow 200, loops need to be treated separately. In the workflow 200 shown in FIG. 6, sub-activities B 212 and C 213 can iteratively be executed according to a while loop 204. Using the previously introduced labeling technique, where the sub-activities 211 to 214 of the workflow having labels 211-*a* to 214-*a*, the while loop 204 may be treated like a Sequence block 205. According to the previously introduced authorization check algorithm, a partial authorization needs to be checked, if a Switch block 203 is entered in the workflow 200. In other words, even if the workflow 200 comprises a while loop 204, the previously introduced authorization checks only needs two checks for partial authorization, when using the first labeling technique. Using local order encoding, an execution history has to be erased to the entry point of the while loop 204 if a further iteration is initiated in order to enable a prefix check as described above. Otherwise, a path history will be inflated by loop nested switches.

Figure 8:
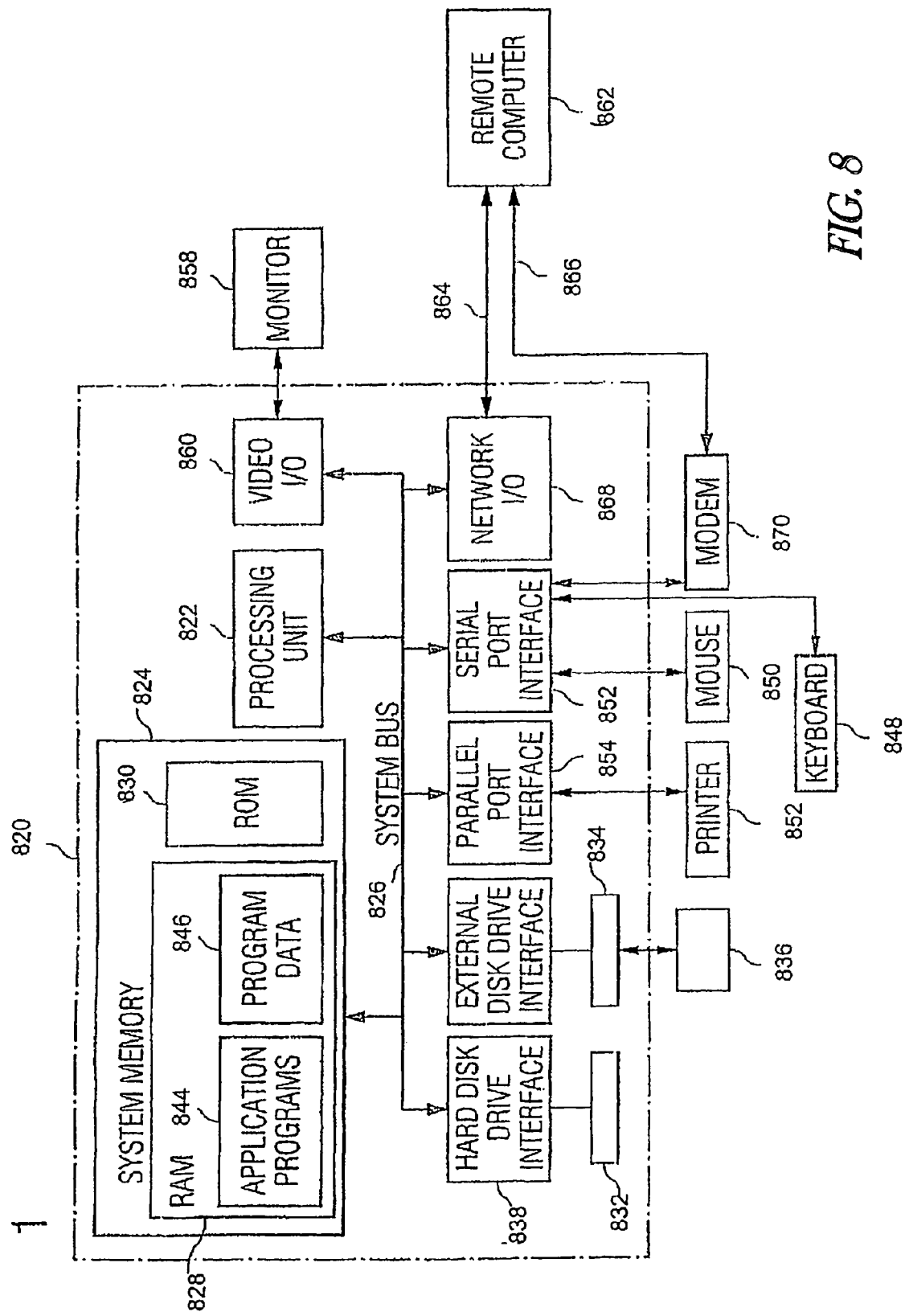
FIG. 8 shows an exemplary computer (network) system.

With reference to FIG. 8, an exemplary system for implementing the invention includes a general purpose computing device in the form of a conventional computing environment 820 (e.g. personal computer), including a processing unit 822, a system memory 824, and a system bus 826, that couples various system components including the system memory 824 to the processing unit 822. The processing unit 822 may perform arithmetic, logic and/or control operations by accessing system memory 824. The system memory 824 may store information and/or instructions for use in combination with processing unit 822. The system memory 824 may include volatile and non-volatile memory, such as random access memory (RAM) 828 and read only memory (ROM) 830. A basic input/output system (BIOS) containing the basic routines that helps to transfer information between elements within the personal computer 820, such as during start-up, may be stored in ROM 830. The system bus 826 may be any of several types of bus structures including a memory bus or memory controller, a peripheral bus, and a local bus using any of a variety of bus architectures.

The personal computer 820 may further include a hard disk drive 832 for reading from and writing to a hard disk (not shown), and an external disk drive 834 for reading from or writing to a removable disk 36. The removable disk may be a magnetic disk for a magnetic disk driver or an optical disk such as a CD ROM for an optical disk drive. The hard disk drive 834 and external disk drive 834 are connected to the system bus 826 by a hard disk drive interface 838 and an external disk drive interface 840, respectively. The drives and their associated computer-readable media provide non-volatile storage of computer readable instructions, data structures, program modules and other data for the personal computer 820. The data structures may include relevant data of the implementation of the security enforcement strategy method for a composite application, as described in greater detail above. The relevant data may be organized in a database, for example a relational or object database.

Although the exemplary environment described herein employs a hard disk (not shown) and an external disk 842, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 842, ROM 830 or RAM 828, including an operating system (not shown), one or more application programs 844, other program modules (not shown), and program data 846. The application programs may include at least a part of the functionality as detailed in FIGS. 1 to 7.

A user may enter commands and information, as discussed below, into the personal computer 820 through input devices such as keyboard 848 and mouse 850. Other input devices (not shown) may include a microphone (or other sensors), joystick, game pad, scanner, or the like. These and other input devices may be connected to the processing unit 822 through a serial port interface 852 that is coupled to the system bus 826, or may be collected by other interfaces, such as a parallel port interface 854, game port or a universal serial bus (USB). Further, information may be printed using printer 856. The printer 856, and other parallel input/output devices may be connected to the processing unit 822 through parallel port interface 854. A monitor 858 or other type of display device is also connected to the system bus 826 via an interface, such as a video input/output 860. In addition to the monitor, computing environment 820 may include other peripheral output devices (not shown), such as speakers or other audible output.

The computing environment 820 may communicate with other electronic devices such as a computer, telephone (wired or wireless), personal digital assistant, television, or the like. To communicate, the computer environment 820 may operate in a networked environment using connections to one or more electronic devices. FIG. 8 depicts the computer environment networked with remote computer 862. The remote computer 862 may be another computing environment such as a server, a router, a network PC, a peer device or other common network node, and may include many or all of the elements described above relative to the computing environment 820. The logical connections depicted in FIG. 8 include a local area network (LAN) 864 and a wide area network (WAN) 866. Such networking environments are commonplace in offices, enterprise-wide computer networks, intranets and the Internet.

When used in a LAN networking environment, the computing environment 820 may be connected to the LAN 864 through a network I/O 868. When used in a WAN networking environment, the computing environment 820 may include a modem 870 or other means for establishing communications over the WAN 866. The modem 870, which may be internal or external to computing environment 820, is connected to the system bus 826 via the serial port interface 852. In a networked environment, program modules depicted relative to the computing environment 820, or portions thereof, may be stored in a remote memory storage device resident on or accessible to remote computer 862. Furthermore other data relevant to the application of the insurance claim management evaluation method (described in more detail further below) may be resident on or accessible via the remote computer 862. The data may be stored for example in an object or a relation database. It will be appreciated that the network connections shown are exemplary and other means of establishing a communications link between the electronic devices may be used.

The above-described computing system is only one example of the type of computing system that may be used to implement the method for a secure enforcement strategy for a composite application.

| List of Reference Numerals | |
|---|---|
| 100; 200 | workflow |
| 101; 201 | starting element |
| 102; 202 | ending element |
| 111-118; 211-214; 311-314 | sub-activity |
| 103, 104; 203; 303 | Switch block |
| 105, 106, 107; 205 | Sequence block |
| 204 | while loop |
| 110; 210 | workflow tree |
| 103-a, 104-a, 111-a-118-a; 211-a-214-a | node label |
| 211-b-214-b | alternative node label |
| 300 | path label |
| 400 | authorization trie |
| 401-402 | construction of an authorization trie |
| 501 to 503 | construction of a compressed path label |
| 820 | conventional computing environment |
| 822 | processing unit |
| 824 | system memory |
| 826 | system bus |
| 828 | random access memory (RAM) |
| 830 | read only memory (ROM) |
| 832 | hard disk drive |
| 834 | external disk drive |
| 836 | removable disk |
| 838 | hard disk drive interface |
| 840 | external disk drive interface |
| 842 | external disk |
| 844 | one or more application programs |
| 846 | program data |
| 848 | keyboard |
| 850 | mouse |

| List of Reference Numerals | |
|---|---|
| 852 | serial port interface |
| 854 | parallel port interface |
| 856 | printer |
| 858 | monitor |
| 860 | video input/output |
| 862 | remote computer |
| 864 | local area network (LAN) |
| 866 | wide area network (WAN) |
| 868 | network I/O |
| 870 | a modem |

What is claimed is:

1. A computer-implemented method for a security enforcement strategy for a composite application, comprising:
    providing a workflow for the composite application, the composite application constructed from a set of sub-applications, at least a plurality of the sub-applications each having a policy;
    generating, using a processor of a machine, a consolidated workflow policy for the workflow by combining the policies of the sub-applications and by taking into account a control flow of the workflow, the control flow providing an order in which the set of sub-applications are performed; and
    enforcing the consolidated workflow policy using a security index structure based on labels applied to the sub-applications and path labels representing positions of the sub-applications on corresponding execution paths in the workflow, the enforcing of
    the consolidated workflow policy by using the security index structure for the consolidated workflow policy adapted for checking authorization in the workflow at a start of the workflow based on a request being from a fully authorized user and
    the enforcing of the consolidated workflow policy by using the security index structure for the consolidated workflow policy adapted for checking authorization in the workflow at the start of the workflow and at a switch block entered in the workflow based on the request being from a partially authorized user.

2. The computer-implemented method of claim 1, further comprising:
    determining possible execution paths in the workflow.

3. The computer-implemented method of claim 1, wherein providing a workflow further comprises:
    organizing the workflow in a workflow tree according to the control flow of the workflow, the workflow tree comprising at least one structured activity and a set of sub-activities, wherein the sub-activities represent invocations of the sub-applications, respectively.

4. The computer-implemented method of claim 3, further comprising:
    providing a node label activity for the at least one structured activity and a node label for each sub-activity of the set of sub-activities, respectively.

5. The computer-implemented method of claim 4, wherein each of the node labels comprises a label attribute and a type attribute.

6. The computer-implemented method of claim 4, wherein the node labels comprise information about positions of the sub-activities in the workflow.

7. The computer-implemented method of claim 4, further comprising:

constructing at least one path label using some of the node labels that are along at least one execution path of the possible execution paths in the workflow.

8. The computer-implemented method of claim 7, further comprising:
storing information about the least one execution path in the security index structure.

9. The computer-implemented method of claim 8, wherein storing information about the at least one execution path comprises:
storing the at least one path label of the at least one execution path in the security index structure.

10. The computer-implemented method of claim 7, wherein enforcing the consolidated workflow policy further comprises:
performing access control by means of an extended prefix check by checking whether a node label of a sub-activity of the sub-activities is a prefix of the path label of the at least one execution path of the security index structure, wherein the sub-activity lies on the at least one execution path.

11. A non-transitory machine-readable medium storing instructions, which when executed by at least one processor of a machine, cause the machine to perform operations comprising:
providing a workflow for the composite application, the composite application constructed from a set of sub-applications, at least a plurality of the sub-applications each having a policy;
generating, using at least one processor, a consolidated workflow policy for the workflow by combining the policies of the sub-applications and by taking into account a control flow of the workflow, the control flow providing an order in which the set of sub-applications are performed; and
enforcing the consolidated workflow policy using a security index structure based on labels applied to the sub-applications and path labels representing positions of the sub-applications on corresponding execution paths in the workflow, the enforcing of
the consolidated workflow policy by using a security index structure for the consolidated workflow policy adapted for checking authorization in the workflow at a start of the workflow based on a request being from a fully authorized user; and
the enforcing of the consolidated workflow policy by using the security index structure for the consolidated workflow policy adapted for checking authorization in the workflow at the start of the workflow and at is switch block entered in the workflow based on the request being from a partially authorized user.

12. A workflow management system for security enforcement of a composite application, comprising:
a processor device of a machine;
workflow manager to provide, using the processor, a workflow for the composite application, the composite application constructed from a set of sub-applications, at least a plurality of the sub-applications each having a policy;
a consolidated workflow policy for the workflow, the consolidated workflow policy combining the policies of the sub-applications by taking into account a control flow of the workflow, the control flow providing an order in which the set of sub-applications are performed; and
a security index structure, used to enforce the consolidated workflow policy, that is based on labels applied to the sub-applications and path labels representing positions of the sub-applications on corresponding execution paths in the workflow, the security index structure adapted for checking authorization in the workflow at a start of the workflow based on a request to perform the workflow being from a fully authorized user and adapted for checking authorization in the workflow at the start of the workflow and at a switch block entered in the workflow based on the request being from a partially authorized user.

13. The system of claim 12, wherein the workflow manager is operable to determine possible execution paths in the workflow.

14. The system of claim 12, wherein the workflow is organized in a workflow tree according to the control flow of the workflow, the workflow tree comprising at least one structured activity and a set of sub-activities, wherein the sub-activities represent invocations of the sub-applications, respectively.

15. The system of claim 14, wherein a node label activity for the at least one structured activity and a node label for each sub-activity of the set of sub-activities, respectively is provided.

16. The system of claim 15, wherein each of the node labels comprises a label attribute and a type attribute.

17. The system of claim 15, wherein the node labels comprise information about the sub-activities' positions in the workflow.

18. The system of claim 15, further comprising:
at least one path label constructed from some of the node labels that are along at least one execution path of the possible execution paths in the workflow.

19. The system of claim 18, wherein the secant index structure stores information about the at least one execution path.

20. The system of claim 19, wherein the security index structure further comprises the at least one path label of the at least one execution path.

21. The system claim 18, further comprising means for performing access control by means of an extended prefix check by checking whether a node label of a sub-activity of the sub-activities is a prefix of the path label of the at least one execution path of the security index structure, wherein the sub-activity lies on the at least one execution path.

22. The computer-implemented method of claim 1, wherein the security index structure comprises:
at least one execution path of a set of possible execution paths of a workflow comprising a set of sub-activities; and
at least one path label for the at least one execution path, wherein the path label identities those sub-activities of the set of sub-activities that lie on the at least one execution path.

23. A computer-implemented method for a security enforcement strategy for a composite application, comprising:
providing a workflow for the composite application, the composite application constructed from a set of sub-applications, at least a plurality of the sub-applications each having a policy;
determining possible execution paths in the workflow;
generating, using a processor of a machine, a consolidated workflow policy for the workflow by combining at least the policies of the sub-applications which are along one of the possible execution paths; and
enforcing the consolidated workflow policy using a security index structure based on labels applied to the sub-applications and path labels representing positions of the sub-applications on corresponding execution paths in the workflow, the security index structure storing information about at least one execution path of the possible execution paths, the security index structure adapted for checking authorization in the workflow at a start of the workflow based on a request to perform the workflow being from a fully authorized user and adapted for checking authorization in the workflow at the start of the workflow and at a switch block entered in the workflow based on the request being from a partially authorized user.

24. The method of claim 1, wherein the labels comprise a qualified label of a node that represents a label of the node combined with labels of ancestors of the node.

* * * * *